(12) United States Patent
Katrak et al.

(10) Patent No.: US 7,343,897 B2
(45) Date of Patent: Mar. 18, 2008

(54) ENGINE CONTROL SYSTEM WITH USER-COMMANDED ENGINE SPEED ADJUSTMENTS IN VARYING INCREMENTS

(75) Inventors: Kerfegar K. Katrak, Fenton, MI (US); Donald A. Eveleth, Highland, MI (US); Barbara A. Shuler, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 66 days.

(21) Appl. No.: 11/387,017

(22) Filed: Mar. 22, 2006

(65) Prior Publication Data

US 2007/0221168 A1   Sep. 27, 2007

(51) Int. Cl.
*F02D 41/00* (2006.01)
*F02D 31/00* (2006.01)

(52) U.S. Cl. .............. 123/352; 123/350; 123/361; 180/179

(58) Field of Classification Search ........ 123/350–356, 123/361; 180/179
See application file for complete search history.

(56) References Cited

U.S. PATENT DOCUMENTS

| | | | | | |
|---|---|---|---|---|---|
| 2,971,596 | A | * | 2/1961 | Davis et al. | 123/352 |
| 3,172,497 | A | * | 3/1965 | Stoner et al. | 123/352 |
| 4,191,270 | A | * | 3/1980 | Monteith | 180/53.4 |
| 4,372,265 | A | * | 2/1983 | Kasiewicz | 123/352 |
| 4,779,591 | A | * | 10/1988 | Tordenmalm | 123/352 |
| 5,310,974 | A | * | 5/1994 | Churchill et al. | 200/566 |
| 5,519,259 | A | * | 5/1996 | Voigt | 123/361 |
| 6,552,439 | B2 | * | 4/2003 | Dunsworth et al. | 123/352 |
| 2004/0195916 | A1 | | 10/2004 | Katrak et al. | 307/4 |

* cited by examiner

*Primary Examiner*—T. M. Argenbright (57) ABSTRACT

An engine control system includes an engine with an output shaft. A power take-off device interfaces with the output shaft and provides rotational power to an auxiliary device. A user input device includes a first engine speed control that commands an increase in engine speed by a first amount to increase the rotational power to the auxiliary device when a user selects the first engine speed control. A second engine speed control commands an increase in engine speed by a second amount that is greater than the first amount to increase the rotational power to the auxiliary device when the user selects the second engine speed control. The user input device includes a speed cancellation control that commands a reversal of a net increase in the speed of the engine that is commanded via the user input device when the user selects the speed cancellation control.

27 Claims, 8 Drawing Sheets

| Input 1 | State |
|---|---|
| Low | Speed-down Fast |
| High | Speed-up Fast |
| Value | No Action |

FIG. 9A

| Input 1 | Input 2 | State |
|---|---|---|
| Low | High | Speed-down Fast |
| High | Low | Speed-up Fast |
| High | High | No Action |
| Low | Low | No Action |

FIG. 9B

| Input 1 | Input 2 | State |
|---|---|---|
| Low | Low | Speed-down Fast |
| High | High | Speed-up Fast |
| Low | High | No Action |
| High | Low | No Action |

FIG. 10A

| Input 1 | Input 2 | State |
|---|---|---|
| Low | High | Speed-down Fast |
| High | Low | Speed-up Fast |
| Value | Value | No Action |

FIG. 10B

| Input 1 | Input 2 | State |
|---|---|---|
| Low | Low | Speed-down Fast |
| High | High | Speed-up Fast |
| Value | Value | No Action |

FIG. 11A

| Input 1 | Input 2 | Input 3 | State |
|---|---|---|---|
| High | Low | Low | Speed-up Fast |
| Low | High | Low | Speed-down Fast |
| Low | Low | High | No Action |

FIG. 11B

| Input 1 | Input 2 | Input 3 | State |
|---|---|---|---|
| High | High | Low | Speed-up Fast |
| Low | High | High | Speed-down Fast |
| High | Low | High | No Action |

FIG. 12A

| Input 1 | Input 2 | Input 3 | State |
|---|---|---|---|
| Low | Value | High | Off |
| High | Value | Low | On |
| Value | Low | High | Speed-down |
| Value | High | Low | Speed-up |
| High | Low | Value | Speed-down Fast |
| Low | High | Value | Speed-up Fast |
| Value | Value | Value | No Action |

FIG. 12B

| Input 1 | Input 2 | Input 3 | State |
|---|---|---|---|
| High | Value | High | Invalid |
| High | Value | Low | On |
| High | Low | High | Invalid |
| High | High | Low | Invalid |
| High | Low | Value | Speed-down Fast |
| High | High | Value | Invalid |
| High | Value | Value | Invalid |

| Input 1 | Input 2 | Input 3 | State |
|---|---|---|---|
| Value | Value | High | Invalid |
| Value | Value | Low | Invalid |
| Value | Low | High | Speed-down |
| Value | High | Low | No Action |
| Value | Low | Value | Invalid |
| Value | High | Value | Invalid |
| Value | Value | Value | No Action |

FIG. 12D

| Input 1 | Input 2 | Input 3 | State |
|---|---|---|---|
| Low | Value | High | Off |
| Low | Value | Low | Invalid |
| Low | Low | High | Invalid |
| Low | High | Low | Invalid |
| Low | Low | Value | Invalid |
| Low | High | Value | No Action |
| Low | Value | Value | Invalid |

ENGINE CONTROL SYSTEM WITH USER-COMMANDED ENGINE SPEED ADJUSTMENTS IN VARYING INCREMENTS

FIELD OF THE INVENTION

The present invention relates to engine control systems for vehicles, and more particularly to engine control systems that include user-commanded engine speed adjustments.

BACKGROUND OF THE INVENTION

Vehicles often include auxiliary equipment that requires power for operation. The auxiliary equipment may be used when the vehicle is stationary and/or moving. For example, a snow removal truck requires operation of a snow plow and/or a salt spreader while the truck is in motion. Snow plows are often controlled by hydraulic systems to raise, lower, and tilt the plow blade. Additionally, a truck that is used to service power and/or telephone lines requires operation of a cherry picker. Cherry pickers are typically controlled by hydraulic systems to raise, lower, and rotate the cherry picker bucket.

In one approach, the hydraulic systems include hydraulic pumps with DC motors that are powered by the vehicle battery. However, such DC motors require a significant amount of power. In another approach, the hydraulic pumps are powered by a power take-off (PTO) system. The PTO system interfaces with an engine shaft of a vehicle to provide rotational power to auxiliary equipment.

Figure 1:
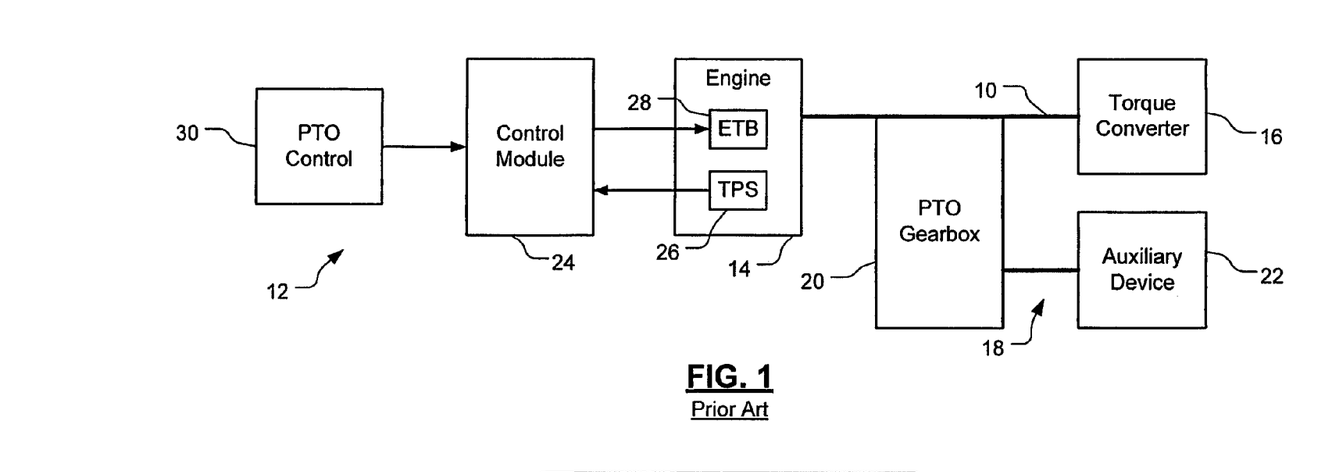
FIG. 1 is a functional block diagram of an engine control system including a power take-off (PTO) system according to the prior art.

Referring now to FIG. 1, an engine shaft 10 of a vehicle 12 is connected between an engine 14 of the vehicle 12 and a torque converter 16. A PTO system 18 includes a PTO gearbox 20 that interfaces with the engine shaft 10 to provide rotational power to an auxiliary device 22. For example, the auxiliary device 22 may include a hydraulic pump. The added load of the PTO system 18 reduces torque that is generated at the engine shaft 10. To provide sufficient torque to support the PTO system 18, an engine control module 24 commands an increase in the speed of the engine 14. For example, the control module 24 may increase the speed of the engine 14 by adjusting throttle position.

The engine 14 includes a throttle position sensor (TPS) 26 and an electronic throttle body (ETB) 28. The TPS 26 generates one or more position signals that indicate a throttle position. The control module 24 adjusts the throttle position by transmitting a throttle adjustment signal to the ETB 28. Since the auxiliary device 22 may not be required to operate continuously, the vehicle 12 includes a PTO control device 30 that communicates with the control module 24.

Figure 2:
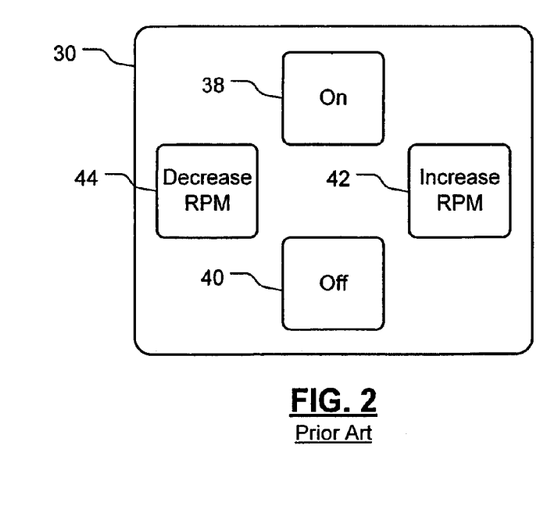
FIG. 2 illustrates an exemplary PTO control device that responds to user interaction according to the prior art.

Referring now to FIG. 2, an exemplary PTO control device 30 includes an on button 38, an off button 40, a speed increase button 42, and a speed decrease button 44. For example, the PTO control device 30 may be mounted inside of the vehicle 12. A user presses the on button 38 when operation of the auxiliary device 22 is required. Pressing the on button 38 may automatically increase the speed of the engine 14 by a predetermined amount. Pressing the on button 38 also enables the speed increase and speed decrease buttons 42 and 44, respectively. A user presses the speed increase button 42 in order to increase the speed of the engine 14. For example, pressing the speed increase button 42 may increase a rotational velocity of the engine shaft 10 by 100 revolutions per minute (rpm). Pressing the speed increase button 42 again may increase the speed of the engine 14 by another 100 rpm. Holding the speed increase button 42 down may continuously increase the speed of the engine 14 by 100 rpm at a predetermined rate. Alternatively, the rate that increments of 100 rpm are added to the speed of the engine 14 may increase while the speed increase button 42 is continuously held down.

The user presses the speed decrease button 44 in order to decrease the speed of the engine 14. For example, pressing the speed decrease button 44 may decrease the speed of the engine 14 by 100 rpm. Pressing the speed decrease button 44 again may decrease the speed of the engine 14 by another 100 rpm. Holding the speed decrease button 44 down may continuously decrease the speed of the engine 14 by 100 rpm at a predetermined rate. Alternatively, the rate that the increments of 100 rpm are subtracted from the speed of the engine 14 may increase while the speed decrease button 44 is continuously held down.

In order to prevent adverse changes in the operation of the vehicle 12, the user is typically unable to decrease the speed of the engine 14 past a default speed of the engine 14 that exists when the user presses the on button 38. However, this assumes that the vehicle 12 is stationary. When the vehicle 12 is moving, the user is typically unable to decrease the speed of the engine 14 past a minimum speed that is sufficient to maintain a current speed of the vehicle 12.

The user presses the off button 40 in order to discontinue operation of the auxiliary device 22. Pressing the off button 40 disables the speed increase and speed decrease buttons 42 and 44, respectively, and returns the speed of the engine 14 to a previous speed of the engine 14 that existed before the user originally pressed the on button 38. For example, if the speed of the engine 14 had been increased by 1000 rpm via the PTO control device 30, the control module 24 decreases the speed of the engine 14 by 1000 rpm when the off button 40 is pushed. In order to prevent abrupt changes in the speed of the engine 14, the control module 24 may ramp any changes in the speed of the engine 14 that are commanded when the off button 40 is pushed.

While the PTO control device 30 allows a user to both increase and decrease the speed of the engine 14, the increments at which the engine speed are increase or decreased are fixed. For example, if the speed increase button 42 increases the speed of the engine 14 by 100 rpm, the user is required to press the speed increase button 42 ten times to increase the speed by 1000 rpm. Additionally, in this case, the user is unable to adjust the speed of the engine 14 in increments that are less than 100 rpm. After a user adjusts the speed of the engine 14 a first time via the PTO control device 30, the user may want to adjust the speed of the engine 14 again. In order to use the default engine speed that existed after the user pressed the on button 38 as a base speed, the user is required to press the off button 40 and then the on button 38 again. This wastes time and puts unnecessary stress on the engine 14 and PTO system 18.

SUMMARY OF THE INVENTION

An engine control system according to the present invention includes an engine with an output shaft. A power take-off (PTO) device interfaces with the output shaft and provides rotational power to an auxiliary device. A user input device includes a first engine speed control that commands an increase in a speed of the engine by a first amount in order to increase the rotational power to the auxiliary device when a user selects the first engine speed control. A second engine speed control commands an increase in the speed of the engine by a second amount that is greater than the first amount in order to increase the rotational power to the auxiliary device when the user selects the second engine speed control.

In other features, the user input device further includes a third engine speed control that commands a decrease in the speed of the engine by a third amount in order to decrease the rotational power to the auxiliary device when the user selects the third engine speed control. A fourth engine speed control commands a decrease in the speed of the engine by a fourth amount that is greater than the third amount in order to decrease the rotational power to the auxiliary device when the user selects the fourth engine speed control. The user input device includes a speed cancellation control that commands a reversal of a net increase in the speed of the engine that is commanded via the user input device when the user selects the speed cancellation control. The user input device includes a user input activation control. The first and second engine speed controls are initially disabled when the user input device is activated. The user input activation device enables the first and second engine speed controls when the user selects the user input activation control.

In still other features of the invention, the user input device includes a user input deactivation control. The user input deactivation control disables the first and second engine speed controls when the user selects the user input deactivation control. The user input deactivation control commands a reversal of a net increase in the speed of the engine that is commanded via the user input device when the user selects the user input deactivation control. A vehicle comprises the engine control system. The user input device is operable at least one of when the vehicle is moving and/or when the vehicle is stationary.

In yet other features, a vehicle comprises the engine control system. The user input device is located external to the vehicle. Alternatively or additionally, the user input device is located on an instrument panel inside of the vehicle. An engine control module communicates with the user input device and adjusts the speed of the engine in response to user interaction with the user input device. The user input device communicates with the engine control module via a single conductor. The user input device communicates a first operating state to the engine control module by outputting a voltage value that is greater than a first voltage, communicates a second operating state to the engine control module by outputting a voltage value that is less than a second voltage, and communicates a third operating state to the engine control module by outputting a voltage value that is less than or equal to the first voltage and greater than or equal to the second voltage.

In still other features of the invention, the engine control module disables the user input device when the user input device transmits an invalid signal to the engine control module. An engine control module communicates with the user input device and adjusts the speed of the engine in response to user interaction with the user input device. The engine control module disables the first and second engine speed controls and at least one of the third and/or fourth engine speed controls remain enabled when the engine control module detects a short-circuit condition in the user input device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 3:
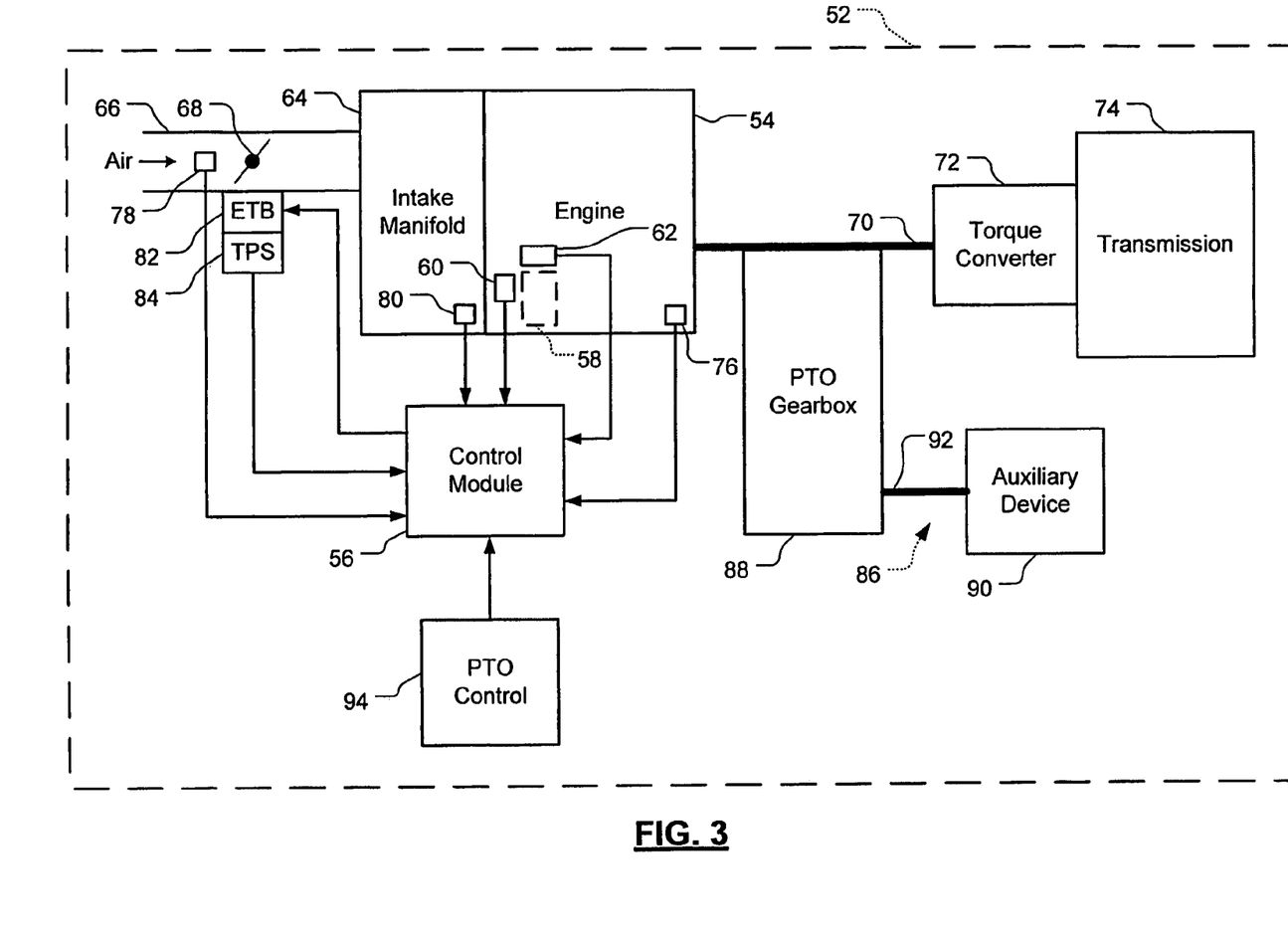
FIG. 3 is a functional block diagram of a vehicle control system including a power take-off (PTO) system and a control module that receives signals from vehicle sensors according to the present invention.

Referring now to FIG. 3, a vehicle 52 includes an engine 54 and a control module 56. The engine 54 includes a cylinder 58 that has a fuel injector 60 and a spark plug 62. Although a single cylinder 58 is shown, those skilled in the art can appreciate that the engine 54 typically includes multiple cylinders 58 with associated fuel injectors 60 and spark plugs 62. For example, the engine 54 may include 4, 5, 6, 8, 10, 12, or 16 cylinders 58.

Air is drawn into an intake manifold 64 of the engine 54 through an inlet 66. A throttle blade 68 regulates air flow through the inlet 66. Fuel and air are combined in the cylinder 58 and are ignited by the spark plug 62. The throttle blade 68 controls the rate that air flows into the intake manifold 64. The control module 56 adjusts the rate that fuel is injected into the cylinder 58 based on the air that is flowing into the cylinder 58 to control the air/fuel ratio within the cylinder 58. An engine shaft 70 at an output of the engine 54 connects to a torque converter 72. The engine 54 drives an automatic transmission 74 through the torque converter 72. The automatic transmission 74 drives an output shaft through a selected gear ratio.

The control module 56 communicates with an engine speed sensor 76 that generates an engine speed signal. The control module 56 also communicates with mass air flow (MAF) and manifold absolute pressure (MAP) sensors 78 and 80, respectively, which generate MAF and MAP signals, respectively. The engine 54 includes an electronic throttle body (ETB) 82 that is associated with the throttle blade 68. The ETB 82 is controlled by the control module 56 and/or a dedicated controller such as an electronic throttle controller (ETC). A throttle position sensor 84 detects a position of the throttle blade 68 in the ETB 82 and generates a position signal that represents the throttle 68 position.

The throttle position sensor 84 transmits the position signal to the control module 56. The control module 56 generates a throttle adjustment signal based on the position signal. The control module 56 transmits the throttle adjustment signal to the ETB 82. Those skilled in the art can appreciate that sensors other than those shown in FIG. 3 may be employed. Additionally, the control module 56 may receive position signals from more than one throttle position sensor 84 for added redundancy.

The vehicle 52 includes a power take-off (PTO) system 86, which includes a PTO gearbox 88 that interfaces with the engine shaft 70 and provides rotational power to an auxiliary device 90. For example, the PTO gearbox 88 may interface with the engine shaft 70 via a belt and/or chain system to utilize rotational energy from the engine shaft 70. A PTO shaft 92 at an output of the PTO gearbox 88 connects to the auxiliary device 90. The PTO gearbox 88 may utilize gears to adjust a speed of the PTO shaft 92 with respect to the engine shaft 70.

In an exemplary embodiment, the auxiliary device 90 is a pump for a hydraulic system. However, the auxiliary device 90 may be any vehicle device that utilizes rotational energy. For example, the auxiliary device 90 may also be a salt spreader for a snow removal truck, which directly utilizes rotational energy from the PTO shaft 92 to rotate the salt spreader. The PTO system 86 allows a user to utilize the large rotational energy generated by the engine 54 while eliminating the need to power auxiliary devices 90 with DC power from a vehicle battery alone. The PTO system 86 is operational both while the vehicle 52 is stationary and while the vehicle 52 is moving.

Since the PTO system 86 is an additional load on the engine shaft 70, activating the PTO system 86 without first increasing a speed of the engine 54 may cause the vehicle 52 to stall. Operation of the auxiliary device 90 is dependant on the need of a user of the vehicle 52. Therefore, a user interacts with a PTO control device 94 that communicates with the control module 56 to activate the PTO system 86. The user commands an increase in the speed of the engine 54 via the PTO control device 94 before activating the PTO system 86 to ensure sufficient rotational power for the transmission 74 as well as the auxiliary device 90.

While the PTO control device 94 communicates directly with the control module 56 in FIG. 3, the PTO control device 94 may communicate with an independent PTO controller that controls operation of the PTO system 86. Since many vehicles 52 such as compact passenger cars are not likely to utilize a PTO system 86, a vehicle manufacturer may selectively include an independent PTO controller on vehicles 52 during manufacturing. For example, medium to heavy-duty trucks are vehicles 52 that commonly utilize PTO systems 86. Additionally, PTO systems 86 are often installed by after-market vendors. In this case, the PTO controller is only required to work with the vehicle 52 on which the PTO system 86 is installed. This alleviates the need to manufacture PTO controllers that are compatible with a large number of vehicles 52 and/or vehicle controllers. Additionally, the control module 56 may be an engine control module (ECM) or a transmission control module (TCM).

Figure 4:
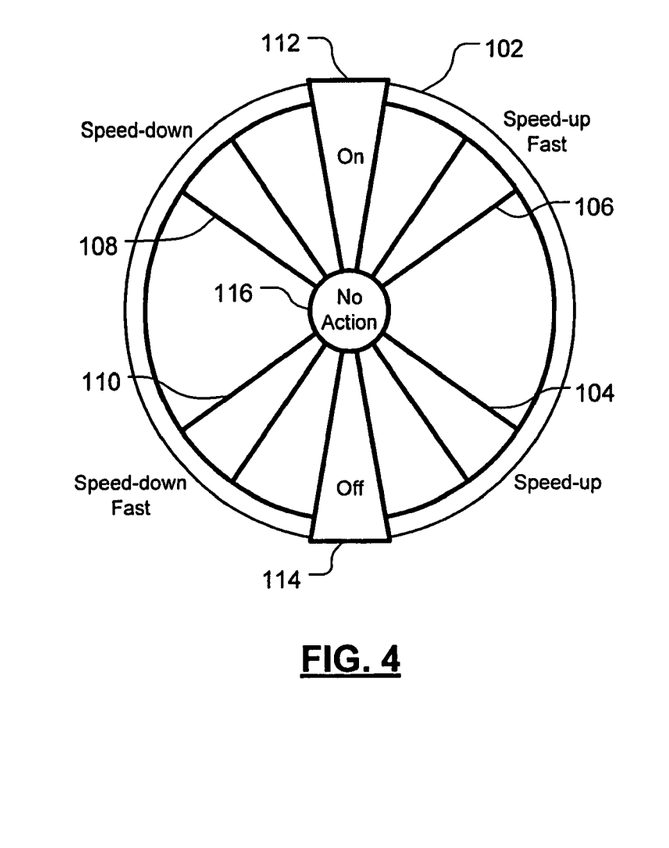
FIG. 4 illustrates a first exemplary PTO control device that includes integrated controls for increasing and decreasing a speed of an engine in different increments.

Referring now to FIG. 4, a first exemplary PTO control device 102 includes integrated controls to facilitate operation of the PTO system 86. The PTO control device 102 includes a control 104 for a speed-up state and a control 106 for a speed-up fast state. A user of the vehicle 52 selects the speed-up control 104 to increase a speed of the engine 54 by a first amount. For example, selecting the speed-up control 104 may increase the rotational velocity of the engine shaft 70 by 50 revolutions per minute (rpm) or another amount. In an exemplary embodiment, the control module 56 receives commands from the PTO control device 102 and adjusts throttle position 68 via the ETB to adjust the speed of the engine 54.

A user selects the speed-up fast control 106 to increase the speed of the engine 54 by a second amount that is greater than the first amount. For example, selecting the speed-up fast control 106 may increase the speed of the engine 54 by 500 rpm or another amount. The PTO control device 102 also includes a control 108 for a speed-down state and a control 110 for a speed-down fast state. A user of the vehicle 52 selects the speed-down control 108 to decrease the speed of the engine 54 by a first amount. For example, selecting the speed-down control 108 may decrease the speed of the engine 54 by 50 rpm or another amount. A user selects the speed-down fast control 110 to decrease the speed of the engine 54 by a second amount that is greater than the first amount. For example, selecting the speed-down fast control 110 may decrease the speed of the engine 54 by 500 rpm or another value.

In an exemplary embodiment, a user incrementally increases/decreases the speed of the engine 54 at a predetermined rate when the user holds down one of the speed-up, speed-up fast, speed-down, or speed-down fast controls 104, 106, 108, or 110. Alternatively, the rate that the speed of the engine 54 increases/decreases may increase while the user continuously presses one of the speed controls 104, 106, 108, or 110. The PTO control device 102 further includes an activation control 112. A user selects the activation control 112 to activate the PTO system 86. In an exemplary embodiment, the speed of the engine 54 increases by a predetermined amount when the user selects the activation control 112 to anticipate use of the PTO system 86. The user also selects the activation control 112 to activate the speed controls 104, 106, 108, and 110. For example, the speed controls 104, 106, 108, and 110 may remain inoperable before the PTO system 86 is activated.

The PTO control device 102 also includes a deactivation control 114. A user selects the deactivation control 114 to deactivate the PTO system 86. In an exemplary embodiment, the speed controls 104, 106, 108, and 110 become disabled when the deactivation control 114 is selected. Additionally, any increases in the speed of the engine 54 that were commanded via the speed controls 104, 106, 108, and 110 is reversed. For example, if the speed of the engine 54 had been increased by 2000 rpm while the PTO system 86 was activated, the speed of the engine 54 is lowered by 2000 rpm when the deactivation control 114 is selected. In an exemplary embodiment, the control module 56 adjusts a rate of change of the speed of the engine 54 when the deactivation control 114 is selected so that changes in the speed of the engine 54 are not abrupt.

The PTO control device 102 also includes a no action control 116. While the vehicle 52 is stationary, a user selects the no action control 116 to return the speed of the engine 54 to a default speed of the engine 54 that is commanded when the PTO system 86 is first activated. When the vehicle 52 is moving, selecting the no action control 116 decreases the speed of the engine 54 to a minimum speed that is sufficient to maintain a current speed of the vehicle 52. Therefore, the no action control 116 differs from the deactivation control 114 in that it returns the speed of the engine 54 to a lower speed without deactivating the PTO system 86 and without disabling the speed controls 104, 106, 108, and 110. For example, if the speed of the engine 54 has already been adjusted via the speed controls 104, 106, 108, and 110 and a user is not aware of the current speed settings, the user can select the no action control 116 and reestablish the speed of the engine 54 for a new application.

FIG. 4 illustrates a first exemplary arrangement of the PTO control device 102 in which each of the speed controls 104, 106, 108, and 110 are evenly spaced about an outer perimeter of the PTO control device 102. For example, each of the speed controls 104, 106, 108, and 110 may be radially separated by 90 degrees with respect to the center of the PTO control device 102. The 90 degree separation ensures a maximum amount of separation between each of the speed controls 104, 106, 108, and 110. This helps to prevent a user from accidentally selecting an unintended speed control 104, 106, 108, or 110. The activation and deactivation controls 112 and 114, respectively, are located at the top and bottom of the PTO control device 102 and are physically distinguished from the speed controls 104, 106, 108, and 110. For example, the activation and deactivation controls 112 and 114, respectively, may be different sizes and/or colors than the speed controls 104, 106, 108, and 110. The no action control 116 is located in the center of the PTO control device 102 for convenience.

While the PTO control device 102 is illustrated in FIG. 4 as a control pad with buttons, those skilled in the art can appreciate that the PTO control device 102 may be any user input device such as a liquid crystal display (LSD) or another user input device. Additionally, depending on a desired application, the PTO control device 102 may be operable both while the vehicle 52 is stationary and while the vehicle 52 is moving. In the event that the PTO control system is operable while the vehicle 52 is stationary, the control module 56 may first ensure that an emergency brake and/or a park gear are engaged. For example, a user may utilize the PTO system 86 to power a salt spreader while the vehicle 52 is moving. Another user may utilize the PTO system 86 to power a hydraulic pump for a cherry picker while the vehicle 52 is stationary. In this case, it may be more efficient to locate the PTO control device 102 on an exterior of the vehicle 52. However, the PTO control device 102 may also be integrated into an instrument cluster on the inside of the vehicle 52. Additionally, wireless controls for the PTO system 86 are contemplated.

Figure 5:
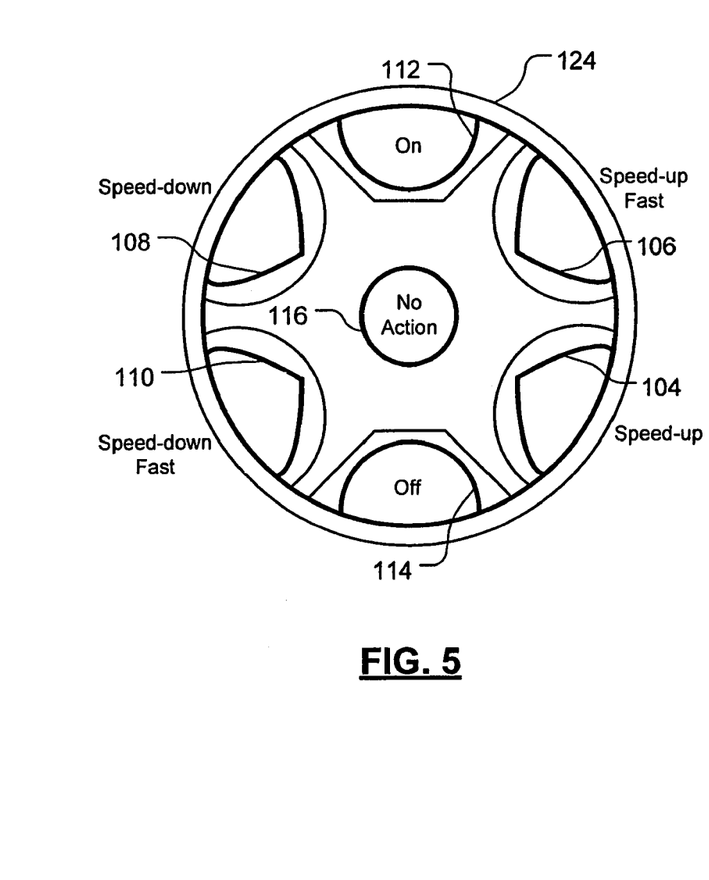
FIG. 5 illustrates a second exemplary PTO control device that includes integrated controls equally spaced about an outer perimeter of the PTO control device.

Referring now to FIG. 5, a second exemplary PTO control device 124 includes the speed-up, speed-up fast, speed-down, speed-down fast, activation, deactivation, and no action controls 104, 106, 108, 110, 112, 114, and 116, respectively. As in FIG. 4, the no action control 116 is centrally located and easily accessible by a user. The speed controls 104, 106, 108, and 110 as well as the activation and deactivation controls 112 and 114, respectively, are all equally spaced about the outer perimeter of the PTO control device 124. Therefore, all of the controls 104, 106, 108, 110, 112, and 114 other than the no action control 116 are each radially separated by 60 degrees. Additionally, the speed controls 104, 106, 108, and 110 are visually distinguished from the activation and deactivation controls 112 and 114, respectively. For example, the speed controls 104, 106, 108, and 110 may be a different shape and/or color than the activation and deactivation controls 112 and 114, respectively.

Figure 6:
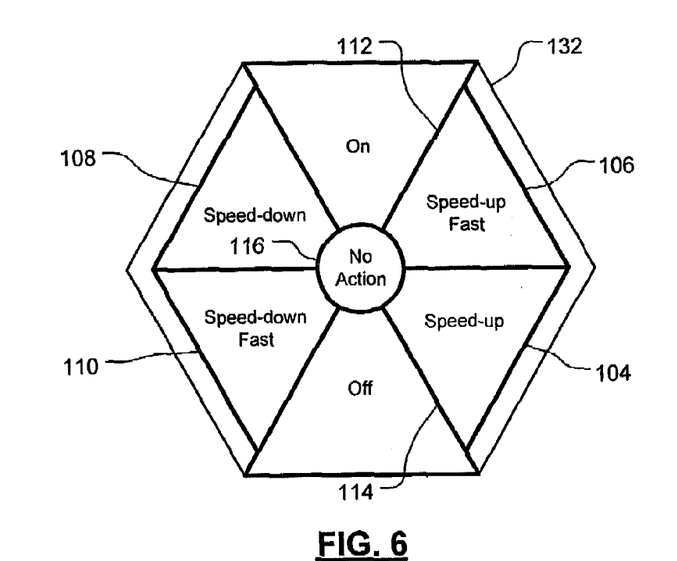
FIG. 6 illustrates a third exemplary PTO control device that includes integrated controls arranged in a hexagonal layout.

Referring now to FIG. 6, a third exemplary PTO control device 132 includes the speed-up, speed-up fast, speed-down, speed-down fast, activation, deactivation, and no action controls 104, 106, 108, 110, 112, 114, and 116, respectively. The PTO control device 132 illustrated in FIG. 6 is arranged in a hexagonal layout. The speed controls 104, 106, 108, and 110 and the activation and deactivation controls 112 and 114, respectively, each occupy one of six equal sections of the PTO control device 132. The no action control 116 is centrally located and round in shape. The activation and deactivation controls 112 and 114, respectively, are visually distinguished from the speed controls 104, 106, 108, and 110. In this case, the activation and deactivation controls 112 and 114, respectively, may have a different size and/or color than the speed controls 104, 106, 108, and 110. For example, in FIG. 6, the activation and deactivation controls 112 and 114, respectively, extend to an outer perimeter of the PTO control device 132. Those skilled in the art can appreciate that PTO control device 132 arrangements other than those illustrated in FIGS. 4-6 may be utilized.

Figure 7:
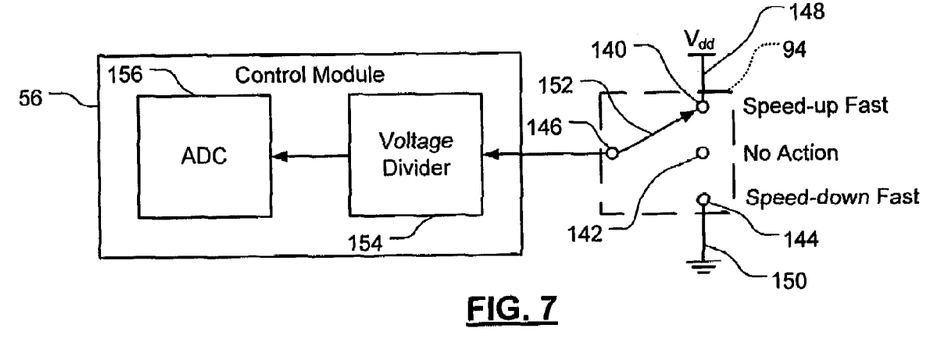
FIG. 7 is a functional block diagram of an exemplary 3-state input to the control module that indicates one of three states on a single conductor.

Referring now to FIG. 7, the PTO control device 94 communicates with the control module 56 via a 3-state input signal. The 3-state input signal allows the PTO control device 94 to transmit one of three states efficiently on a single conductor. In an exemplary embodiment, the 3-state input signal is implemented as a 3-state single wire control, as taught by Katrak et al. in U.S. Pat. Pub. No. 2004/0195916, which is hereby incorporated by reference in its entirety. The PTO control device 94 includes first, second, third and fourth nodes 140, 142, 144, and 146. The first node 140 communicates with a supply potential $V_{dd}$ 148. For example, the supply potential 148 may be equal to 5V. The second node 142 communicates with a ground potential 150.

The third node 144 is isolated between the first and second nodes 140 and 142, respectively.

An adjustable conducting element 152 connects the fourth node 146 to one of the first, second, or third nodes 140, 142, or 144. The control module 56 includes a voltage divider 154 and an analog-to-digital converter (ADC) 156. The fourth node 146 communicates with the voltage divider 154 to transmit a voltage signal to the control module 56. The voltage divider 154 receives the voltage signal and outputs a divided voltage signal. The ADC 156 receives the divided voltage signal and detects a position of the adjustable conducting element 152 based on a value of the voltage signal. In an exemplary embodiment, the first node 140 is associated with the speed-up fast control 106, the second node 142 is associated with the no action control 116, and the third node 144 is associated with the speed-down fast control 110.

The position of the adjustable conducting element 152 changes according to which control 104, 106, 108, 110, 112, 114, or 116 a user selects on the PTO control device 94. For example, when the user selects the speed-up fast control 106, the adjustable conducting element 152 contacts the fourth and first nodes 146 and 140, respectively. The control module 56 detects that the speed-up fast control 106 is selected based on a value of the divided voltage signal. Likewise, when a user selects the speed-down fast control 110, the adjustable conducting element 152 contacts the fourth and third nodes 146 and 144, respectively. The adjustable conducting element 152 contacts the fourth and second nodes 146 and 142, respectively, when the user selects the no action control 116. Alternatively, the adjustable conducting element 152 contacts the fourth node 146 and an arbitrary position between the first and third nodes 140 and 144, respectively, when the user selects the no action control 116.

The control module 56 compares the value of the voltage signal to two or more thresholds in order to detect which control 104, 106, 108, 110, 112, 114, or 116 the user selects. In an exemplary embodiment, the control module 56 detects that the speed-down fast control 110 is selected when the value of the voltage signal is below a first predetermined voltage. For example, the first predetermined voltage may be equal to 1V or another value, which is similar to a short-to-ground condition. In this case, the control module 56 detects that the speed-up fast control 106 is selected when the value of the voltage signal is greater than a second predetermined voltage. For example, the second predetermined voltage may be equal to 4V, which is similar to a short-to-battery condition.

In an exemplary embodiment, the control module 56 detects that the no action control 116 is selected when the value of the voltage signal is equal to a third predetermined voltage that is between the first and second predetermined voltages. For example, the third predetermined voltage may be equal to 2V, which is similar to an open-circuit condition. Alternatively, the control module 56 detects that the no action control 116 is selected when the value of the voltage signal is less than or equal to the first predetermined voltage and greater than or equal to the second predetermined voltage.

The speed controls 104, 106, 108, and 110, the activation and deactivation controls 112 and 114, respectively, and the no action control 116 are preferably assigned to nodes 140, 142, or 144 in the PTO control device 94 according to the likelihood of possible failures in the PTO control device 94. For example, in the PTO control device 94 illustrated in FIG. 7, the most likely failure to take place is a permanent open circuit condition. The second most likely failure is a short-to-ground condition, and the least likely failure of the three possible failures is a short-to-battery condition.

Since the permanent open-circuit condition is the most likely to exist in the event of a failure, the no action control 116 is assigned to the second node 142. Therefore, in the event of a permanent open-circuit condition, the speed of the engine 54 is not unintentionally adjusted. Between the speed-up fast and speed-down fast controls 106 and 110, respectively, a selection of the speed-down fast control 110 due to a failure is least burdensome. This is because unintentionally lowering the speed of the engine 54 is less likely to cause adverse effects in the engine 54 than unintentionally increasing the speed of the engine 54. Therefore, the speed-down fast control 110 is assigned to the third node 144.

While the supply potential 148 and ground potential 150 are illustrated as communicating with the PTO control device 94 in FIG. 7, the control module 56 preferably references the same or an independent ground potential 150 and supply potential 148. Additionally, the PTO control device 94 preferably includes multiple 3-state input signals to communicate all of the speed controls 104, 106, 108, and 110, the activation and deactivation controls 112 and 114, respectively, and the no action control 116 states. In this case, the control module 56 includes additional ADCs 156 to interpret the voltage signals from each of the 3-state inputs.

Instead of 3-state input signals, the PTO control device 94 may also transmit one or more discrete signals that indicate one of two states. In this case, a sufficient number of discrete signals are utilized to communicate each of the speed control 104, 106, 108, and 110, the activation and deactivation control 112 and 114, respectively, and the no action control 116 states. For example, the discrete signals may be analogous to digital logic signals that communicate either a high state or a low state.

Many conventional user input devices include resistors that may be integrated into potentiometers in order to select between multiple modes. The PTO control device 94 illustrated in FIG. 7 does not require resistors for desirable operation. Any required resistors for voltage division or other voltage adjustments may be included in the control module 56. This reduces the size, complexity, and cost of the PTO control device 94.

Figure 8:
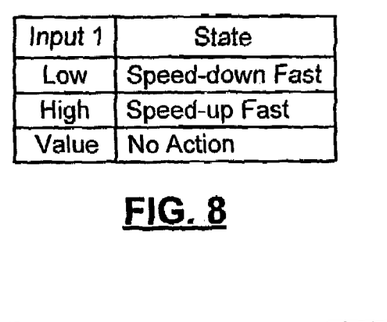
FIG. 8 is a table illustrating a 3-state input that communicates speed-down fast, speed-up fast, and no action states.

Referring now to FIG. 8, operation of the PTO control device 94 with a single 3-state input signal is illustrated. The speed-down fast, speed-up fast, and no action control 110, 106, and 116 states are mapped to the values of the voltage signal as described with respect to FIG. 7. The speed-down fast control 110 state is mapped to the low voltage value, and the speed-up fast control 106 state is mapped to the high voltage value. Additionally, the no action control 116 state is mapped to the intermediate voltage value that is between the high and low voltage values.

Figure 9A:
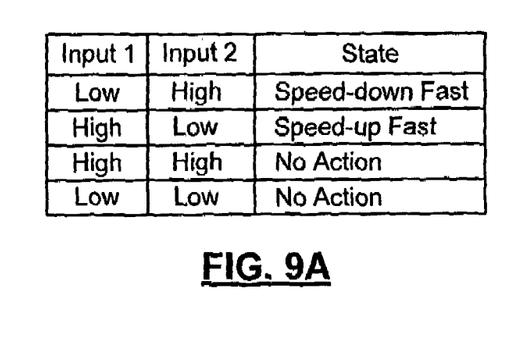
FIGS. 9A and 9B are tables illustrating dual discrete inputs that communicate speed-down fast, speed-up fast, and no action states.
Figure 9B:
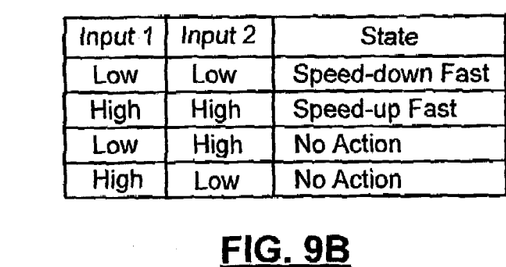

Referring now to FIGS. 9A and 9B, operation of the PTO control device 94 with two discrete inputs is illustrated. In FIG. 9A, the speed-down fast control 110 state is selected when the first input is low and the second input is high. The speed-up fast control 106 state is selected when the first input is high and the second input is low. Additionally, the no action control 116 state is selected when the values of the first and second inputs are the same. FIG. 9B illustrates an alternative embodiment of dual discrete inputs. The speed-down fast control 110 state is selected when both the first input and the second input are low. The speed-up fast control 106 state is selected when both the first input and the second input are high. Additionally, the no action control 116 state is selected when the values of the first and second inputs are different.

Figure 10A:
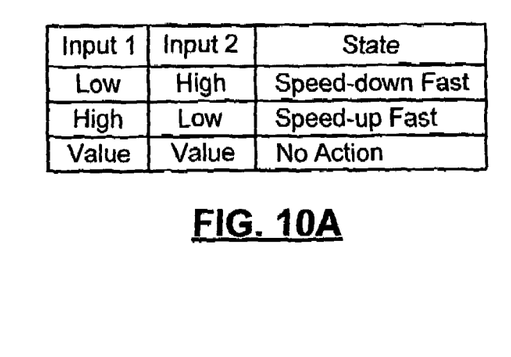
FIGS. 10A and 10B are tables illustrating dual 3-state inputs that communicate speed-down fast, speed-up fast, and no action states that are each separated by two state transitions.
Figure 10B:
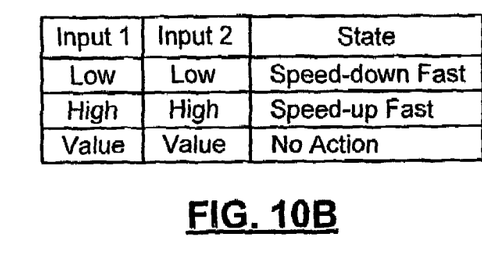

Referring now to FIGS. 10A and 10B, operation of the PTO control device 94 with two 3-state inputs is illustrated. In FIG. 10A, the speed-down fast control 110 state is selected when the value of the first input is a low voltage value and the value of the second input is a high voltage value. The speed-up fast control 106 state is selected when the value of the first input is a high voltage value and the value of the second input is a low voltage value. Additionally, the no action control 116 state is selected when the values of both the first and second inputs are intermediate voltage values.

Each of the states illustrated in FIG. 10A are separated by a minimum of two state transitions. For example, in order to move from the speed-down fast control 110 state to the no action control 116 state, the values of both inputs are required to change. In an exemplary embodiment, a failure state is selected when an unmapped combination occurs. For example, a failure state is selected when the values of the first and second inputs are both high voltage values. The control module 56 may activate an alarm indicator and/or completely shutdown the PTO system 86 when a failure state is selected.

FIG. 10B illustrates an alternative embodiment of dual 3-state inputs. The speed-down fast control 110 state is selected when the values of the first and second inputs are both high voltage values. The speed-up control 104 state is selected when the values of the first and second inputs are both high voltage values. Additionally, the no action control 116 state is selected when the values of the first and second inputs are both intermediate voltage values. As with the mapping scheme illustrated in FIG. 10A, each of the states are separated by a minimum of two state transitions and a failure state is selected when an unmapped combination occurs.

Figure 11A:
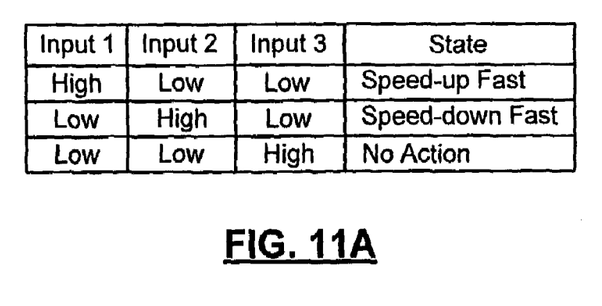
FIGS. 11A and 11B are tables illustrating three discrete inputs that communicate speed-down fast, speed-up fast, and no action states that are each separated a single state transition.
Figure 11B:
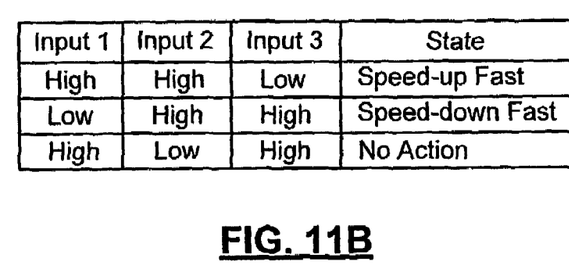

Referring now to FIGS. 11A and 11B, operation of the PTO control device 94 with three discrete inputs is illustrated. The speed-up fast control 106 state is selected when the value of the first input is high and the values of the second and third inputs are low. The speed-down fast control 110 state is selected when the value of the first input is low, the value of the second input is high, and the value of the third input is low. Additionally, the no action control 116 state is selected when the first and second inputs are low and the third input is high. Each of the states illustrated in FIG. 11A are separated by two state transitions, and a failure state is selected when one of the unmapped states occurs.

FIG. 11B illustrates an alternative embodiment of three discrete inputs. The speed-up fast control 106 state is selected when the values of the first and second inputs are high and the value of the third input is low. The speed-down fast control 110 state is selected when the value of the first input is low and the values of the second and third inputs are high. Additionally, the no action control 116 state is selected when the value of the first input is high, the value of the second input is low, and the value of the third input is high. As with the mapping scheme illustrated in FIG. 11A, each of the states are separated by two state transitions, and a failure state is selected when an unmapped state occurs.

Figure 12A:
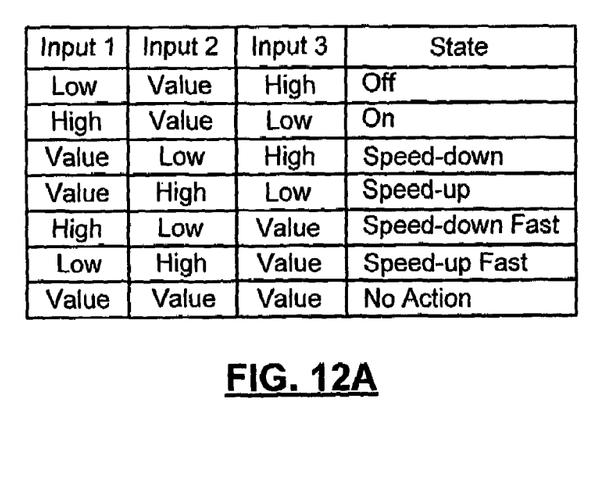
FIG. 12A is a table illustrating three 3-state inputs that communicate on, off, speed-down, speed-up, speed-down fast, speed-up fast, and no action states that are each separated by at least two state transitions.

Referring now to FIG. 12A, operation of the PTO control device 94 with three 3-state inputs is illustrated. The mapping scheme illustrated in FIG. 12A incorporates all of the controls 104, 106, 108, 110, 112, 114, and 116 illustrated in FIGS. 4-6. The deactivation control 114 state is selected when the value of the first input is a low voltage value, the value of the second input is an intermediate voltage value, and the value of the third input is a high voltage value. The activation control 112 state is selected when the value of the first input is a high voltage value, the value of the second input is an intermediate voltage value, and the value of the third input is a low voltage value.

The speed-down control 108 state is selected when the value of the first input is an intermediate voltage value, the value of the second input is a low voltage value, and the value of the third input is a high voltage value. The speed-up control 104 state is selected when the value of the first input is an intermediate voltage value, the value of the second input is a high voltage value, and the value of the third input is a low voltage value.

The speed-down fast control 110 state is selected when the value of the first input is a high voltage value, the value of the second input is a low voltage value, and the value of the third input is an intermediate voltage value. The speed-up fast control 106 state is selected when the value of the first input is a low voltage value, the value of the second input is a high voltage value, and the value of the third input is an intermediate voltage value. The no action control 116 state is selected when the values of the first, second, and third inputs are all intermediate voltage values.

Each of the states illustrated in FIG. 12A are separated by a minimum of two state transitions. This allows for security measures to be implemented, which ensure that neither the speed controls 104, 106, 108, and 110, the activation and deactivation controls 112 and 114, respectively, nor the no action control 116 are unintentionally selected. A failure state is selected when any of the remaining unused input value combinations occur. The PTO control device 94 spends the most time in the no action control 116 state during the life of the vehicle 52. Therefore, it is beneficial to assign an input value combination to the no action control 116 state that generates a low amount of parasitic current. Since the input value combination including intermediate voltage values for all three inputs has the lowest parasitic current, the no action control 116 state is mapped to this combination of input values.

Figure 12B:
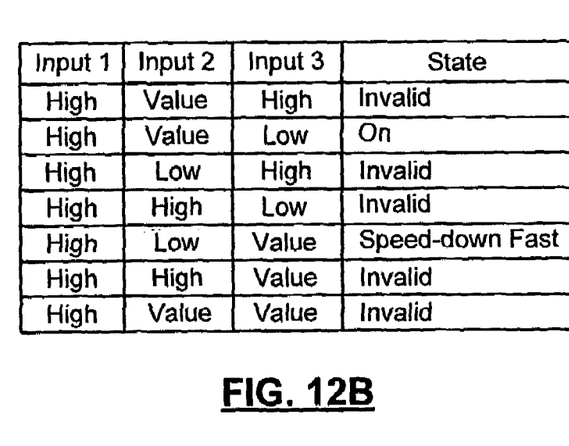
FIG. 12B is a table illustrating on and speed-down fast states that are available during a limited recovery mode triggered by a short-to-battery condition on the first input.

Referring now to FIG. 12B, the control module 56 detects when any of the inputs are shorted-to battery, shorted-to ground, or are permanently in an open-circuit condition. In one exemplary embodiment, the control module 56 activates a failure state when a short-circuit condition is detected at any of the inputs. Alternatively, the control module 56 may initiate a limited recovery mode in which selected control states remain active while the remaining control states become invalid. The limited recovery mode allows a user to continue operating the PTO system 86 in a limited capacity and prevents an abrupt shutdown of the PTO system 86. For example, a worker for an electrical company may be working on power lines in an extended cherry picker bucket when a short condition is detected in the PTO control device 94.

Instead of completely shutting down the PTO system 86 and stranding the worker, the limited recovery mode may allow the worker to return to the ground. In an exemplary embodiment, any valid speed-down control 108 and 110 states, activation and deactivation control 112 and 114 states, and no action control 116 states remain active during a limited recovery mode. However, the control module 56 maps no action control 116 states to any valid speed-up control 104 and/or 106 states that remain when a short circuit condition is detected. In FIG. 12B, the first input is shorted-to-battery. Therefore, the value of the first input is a high voltage value no matter which control 104, 106, 108, 110, 112, 114, or 116 state is selected by the user.

As shown in FIG. 12A, the only valid states that include a high voltage value for the first input are the activation control 112 state and the speed-down fast control 110 state. The activation control 112 state has no effect on the speed of the engine 54 once the PTO system 86 is already activated. Additionally, while the vehicle 52 is stationary, the speed-down fast control 110 state is useful in order to return the speed of the engine 54 to a default speed that exists when the PTO system 86 is first activated. Therefore, the activation control 112 state and the speed-down fast control 110 state remain valid while the remaining states are invalid when the first input is shorted-to-battery.

Figure 12C:
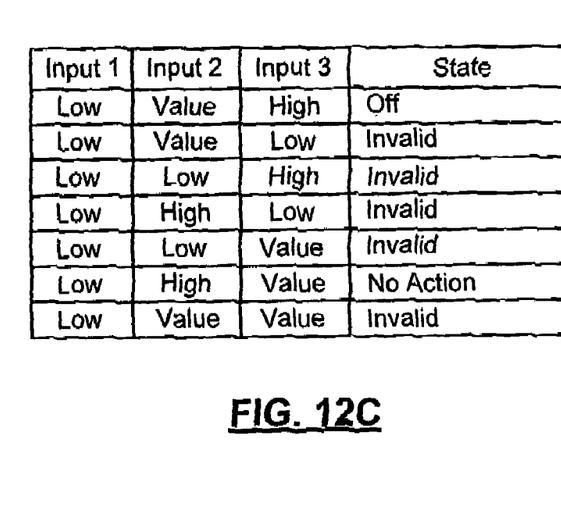
FIG. 12C is a table illustrating a PTO system shutdown mode triggered by a short-to-ground condition on the first input.

Referring now to FIG. 12C, the first input is shorted-to-ground. Therefore, the value of the first input is a low voltage value no matter which control 104, 106, 108, 110, 112, 114, or 116 state is selected by the user. As shown in FIG. 12A, the only valid states that include a low voltage value for the first input are the deactivation control 114 state and the speed-up fast control 106 state. The deactivation control 114 state is useful in shutting down the PTO system 86 during the limited recovery mode. However, the speed-up fast control 106 state may be used to increase the speed of the engine 54 and possibly cause adverse effects in the engine 54 during the limited recover mode.

Therefore, the control module 56 temporarily maps a no action control 116 state to the input value combination that is associated with the speed-up fast control 106 state during normal operations. This prevents a user from increasing the speed of the engine 54 when a short condition exists in the PTO control device 94. The remaining input value combinations are invalid. Alternatively, since no valid control states remain that are capable of adjusting the speed of the engine 54, the control module 56 may shutdown the PTO system 86 when the first input is shorted-to-ground.

Figure 12D:
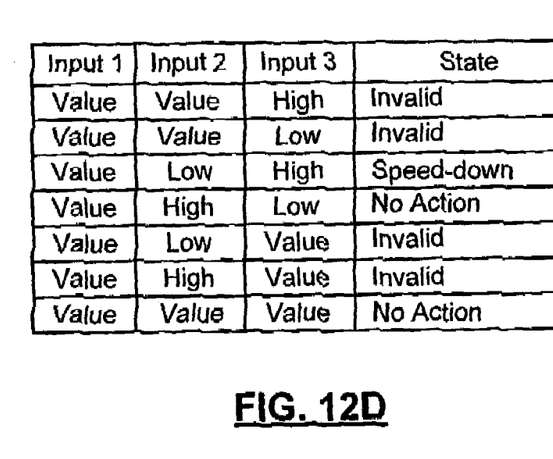
FIG. 12D is a table illustrating speed-down and no action states that are available during a limited recovery mode triggered by a fixed open circuit condition on the first input.

Referring now to FIG. 12D, a permanent open circuit condition exists at the first input. Therefore, the value of the first input is an intermediate voltage value no matter which control 104, 106, 108, 110, 112, 114, or 116 state is selected by the user. As shown in FIG. 12A, the only valid states that include an intermediate voltage value at the first input are the speed-down control 108 state, the speed-up control 104 state, and the no action control 116 state.

The speed-down control 108 state is useful in shutting down the PTO system 86 during the limited recovery mode. However, the speed-up control 104 state may be used to increase the speed of the engine 54 and possibly cause adverse effects in the engine 54 during the limited recovery mode. Therefore, the control module 56 temporarily maps a no action control 116 state to the input value combination that is associated with the speed-up control 104 state during normal operations. The remaining input value combinations are invalid. FIGS. 12B-12D illustrate limited recovery modes associated with short circuit conditions with respect to only the first input. However, analogous operation of the PTO control device 94 is contemplated for limited recovery modes associated with short circuit conditions with respect to the second and third inputs, as is described in further detail below.

Figure 13:
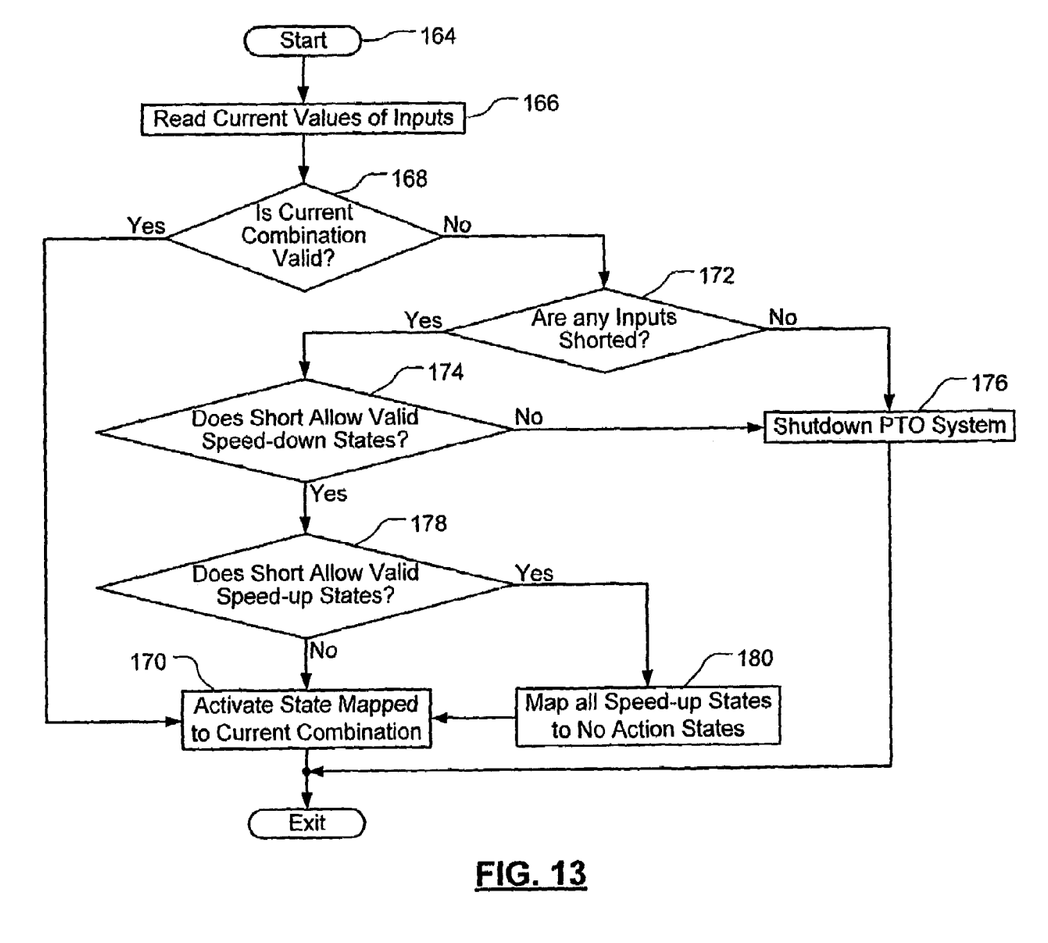
FIG. 13 is a flowchart illustrating steps performed by the control module to detect invalid states and to facilitate limited recovery modes when invalid states are detected.

Referring now to FIG. 13, an exemplary limited recovery mode algorithm begins in step 164. In step 166, the control module 56 reads the current values of the inputs. In step 168, control determines whether the current input value combination is valid. If true, control proceeds to step 170. If false, control determines whether any of the inputs are shorted in step 172. If true, control proceeds to step 174. If false, the control module 56 shuts down the PTO system 86 in step 176 and control ends. In step 174, control determines whether the short condition allows for valid speed-down control 108 and 110 states.

If false, control proceeds to step 176. If true, control determines whether the short condition allows for valid speed-up control 104 states in step 178. If false, control proceeds to step 170. If true, the control module 56 maps no action control 116 states to any valid input value combinations that are associated with speed-up control 104 and 106 states during normal operations and control proceeds to step 170. In step 170, the control module 56 activates the control state that is mapped to the current input value combination and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An engine control system, comprising:
   an engine that includes an output shaft;
   a power take-off (PTO) device that interfaces with said output shaft and that provides rotational power to an auxiliary device; and
   a user input device that includes:
      a first engine speed control that commands an increase in a speed of said engine by a first amount in order to increase said rotational power to said auxiliary device when a user selects said first engine speed control; and
      a second engine speed control that commands an increase in said speed of said engine by a second amount that is greater than said first amount in order to increase said rotational power to said auxiliary device when said user selects said second engine speed control.

2. The engine control system of claim 1 wherein said user input device further includes:
   a third engine speed control that commands a decrease in said speed of said engine by a third amount in order to decrease said rotational power to said auxiliary device when said user selects said third engine speed control; and
   a fourth engine speed control that commands a decrease in said speed of said engine by a fourth amount that is greater than said third amount in order to decrease said rotational power to said auxiliary device when said user selects said fourth engine speed control.

3. The engine control system of claim 1 wherein said user input device includes a speed cancellation control that commands a reversal of a net increase in said speed of said engine that is commanded via said user input device when said user selects said speed cancellation control.

4. The engine control system of claim 1 wherein said user input device includes a user input activation control, wherein said first and second engine speed controls are initially disabled when said user input device is activated, and wherein said user input activation device enables said first and second engine speed controls when said user selects said user input activation control.

5. The engine control system of claim 1 wherein said user input device includes a user input deactivation control and wherein said user input deactivation control disables said first and second engine speed controls when said user selects said user input deactivation control.

6. The engine control system of claim 5 wherein said user input deactivation control commands a reversal of a net increase in said speed of said engine that is commanded via said user input device when said user selects said user input deactivation control.

7. A vehicle comprising the engine control system of claim 1 wherein said user input device is operable at least one of when the vehicle is moving and/or when the vehicle is stationary.

8. A vehicle comprising the engine control system of claim 1 wherein said user input device is located external to said vehicle.

9. A vehicle comprising the engine control system of claim 1 wherein said user input device is located on an instrument panel inside of said vehicle.

10. The engine control system of claim 1 further comprising an engine control module that communicates with said user input device and that adjusts said speed of said engine in response to user interaction with said user input device.

11. The engine control system of claim 10 wherein said user input device communicates with said engine control module via a single conductor and wherein said user input device communicates a first operating state to said engine control module by outputting a voltage value that is greater than a first voltage, communicates a second operating state to said engine control module by outputting a voltage value that is less than a second voltage, and communicates a third operating state to said engine control module by outputting a voltage value that is less than or equal to said first voltage and greater than or equal to said second voltage.

12. The engine control system of claim 10 wherein said engine control module disables said user input device when said user input device transmits an invalid signal to said engine control module.

13. The engine control system of claim 2 further comprising an engine control module that communicates with said user input device and that adjusts said speed of said engine in response to user interaction with said user input device, wherein said engine control module disables said first and second engine speed controls and at least one of said third and/or fourth engine speed controls remain enabled when said engine control module detects a short-circuit condition in said user input device.

14. An engine control system for a vehicle, comprising:
an engine;
an auxiliary device that is driven by the engine; and
a user input device that includes:
  a first engine speed control that commands an increase in a speed of said engine by a first amount in order to increase an output to said auxiliary device when a user selects said first engine speed control;
  a second engine speed control that commands an increase in said speed of said engine by a second amount that is greater than said first amount in order to increase said output to said auxiliary device when said user selects said second engine speed control;
  a third engine speed control that commands a decrease in said speed of said engine by a third amount in order to decrease said output to said auxiliary device when said user selects said third engine speed control; and
  a fourth engine speed control that commands a decrease in said speed of said engine by a fourth amount that is greater than said third amount in order to decrease said output to said auxiliary device when said user selects said fourth engine speed control.

15. A method for operating an engine control system, comprising:
providing a power take-off (PTO) device that interfaces with an output shaft of an engine and that provides rotational power to an auxiliary device;
commanding an increase in a speed of said engine by a first amount in order to increase said rotational power to said auxiliary device when a user selects a first engine speed control; and
commanding an increase in said speed of said engine by a second amount that is greater than said first amount in order to increase said rotational power to said auxiliary device when said user selects a second engine speed control.

16. The method of claim 15 further comprising:
commanding a decrease in said speed of said engine by a third amount in order to decrease said rotational power to said auxiliary device when said user selects a third engine speed control; and
commanding a decrease in said speed of said engine by a fourth amount that is greater than said third amount in order to decrease said rotational power to said auxiliary device when said user selects a fourth engine speed control.

17. The method of claim 15 further comprising reversing a net increase in said speed of said engine that is commanded via at least one of said first engine speed control and/or said second engine speed control when said user selects a speed cancellation control.

18. The method of claim 15 further comprising:
initially disabling said first and second engine speed controls; and
enabling said first and second engine speed controls when said user selects a user input activation control.

19. The method of claim 15 further comprising disabling said first and second engine speed controls when said user selects a user input deactivation control.

20. The method of claim 19 further comprising reversing a net increase in said speed of said engine that is commanded via at least one of said first engine speed control and/or said second engine speed control when said user selects said user input deactivation control.

21. The method of claim 15 further comprising:
implementing said first and second engine speed controls in a vehicle; and
operating said first and second engine speed controls at least one of when said vehicle is moving and/or when said vehicle is stationary.

22. The method of claim 15 further comprising:
implementing said first and second engine speed controls in a vehicle; and
locating said first and second engine speed controls external to said vehicle.

23. The method of claim 15 further comprising:
implementing said first and second engine speed controls in a vehicle; and
locating said first and second engine speed controls on an instrument panel inside of said vehicle.

24. The method of claim 15 further comprising:
outputting a voltage value that is greater than a first voltage in order to communicate a first operating state of the engine control system;

outputting a voltage value that is less than a second voltage in order to communicate a second operating state of the engine control system; and outputting a voltage value that is less than or equal to said first voltage and greater than or equal to said second voltage in order to communicate a third operating state of the engine control system.

25. The method of claim 15 further comprising disabling said first and second engine speed controls in response to an invalid signal.

26. The method of claim 16 further comprising:

disabling said first and second engine speed controls when a short-circuit condition is detected; and maintaining at least one of said third engine speed control and/or said fourth engine speed control in an enabled state in response to said short-circuit condition.

27. A method for operating an engine control system for a vehicle, comprising:

providing an auxiliary device that interfaces with an output shaft of an engine;

commanding an increase in a speed of said engine of said vehicle by a first amount in order to increase an output to said auxiliary device when a user selects a first engine speed control;

commanding an increase in said speed of said engine by a second amount that is greater than said first amount in order to increase said output to said auxiliary device when said user selects a second engine speed control;

commanding a decrease in said speed of said engine by a third amount in order to decrease said output to said auxiliary device when said user selects a third engine speed control; and commanding a decrease in said speed of said engine by a fourth amount that is greater than said third amount in order to decrease said output to said auxiliary device when said user selects a fourth engine speed control.

* * * * *